April 8, 1930.  J. MUIR  1,754,178
PROCESS OF MAKING REMOVABLE EMANATION SEEDS
Original Filed Jan. 12, 1926   2 Sheets-Sheet 1
Fig. 1.
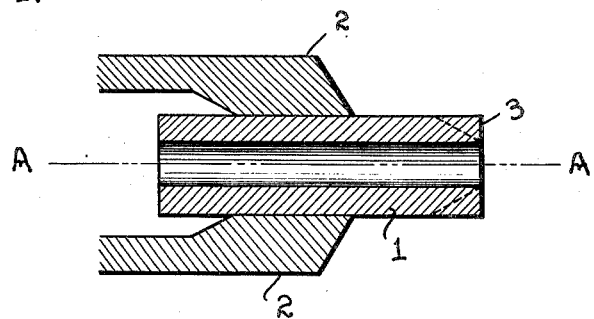
Fig. 2.
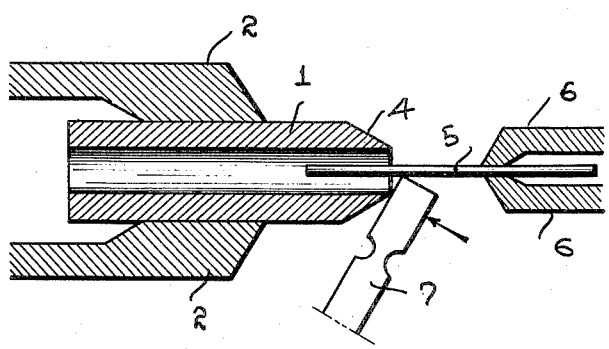
Fig. 4.
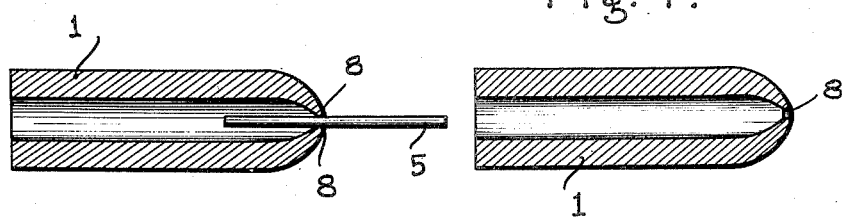
Fig. 3.
INVENTOR.
JOSEPH MUIR.
BY
ATTORNEY.

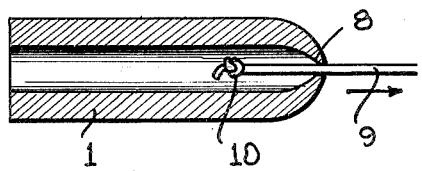
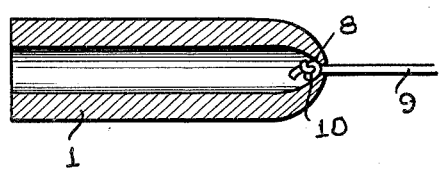
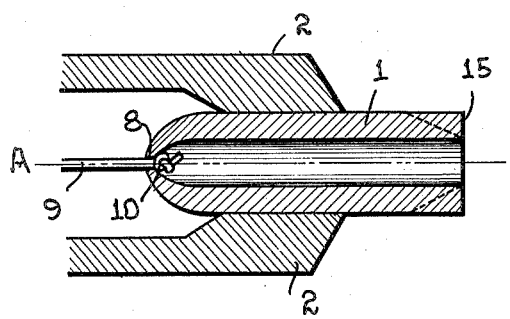
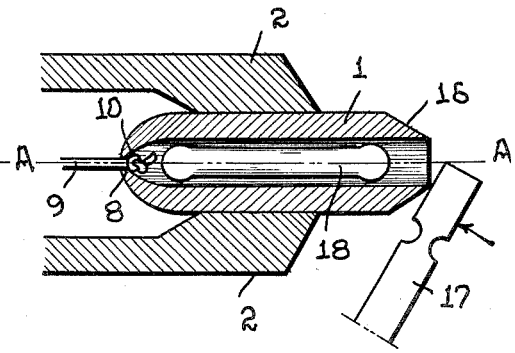
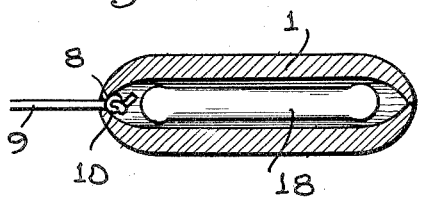
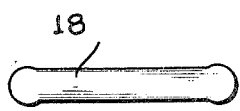
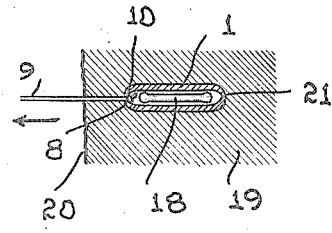

Patented Apr. 8, 1930

1,754,178

UNITED STATES PATENT OFFICE

JOSEPH MUIR, OF NEW YORK, N. Y., ASSIGNOR TO THE RADIUM EMANATION CORPORATION, OF NEW YORK, N. Y., A CORPORATION OF DELAWARE

PROCESS OF MAKING REMOVABLE EMANATION SEEDS

Original application filed January 12, 1926, Serial No. 80,851. Divided and this application filed October 7, 1927. Serial No. 224,740.

My invention relates to the art of intratumoral radiation of tissue with removable seeds containing radium emanation.

It has been customary to treat biological tissue with seeds or tubes containing radium emanation by placing the seed or seeds in the tissue and allowing the former to remain therein permanently. In a number of cases, there is no objection to permanently leaving the seeds in the tissue. However, in certain cases, it is highly objectionable to leave foreign bodies such as seeds in the tissue. It has been proposed to allow the seeds to remain in the tissue for a certain length of time, then open up or cut the tissue, thereafter remove the seeds, and then again close the tissue. Obviously, this practice is not desirable and in some cases it is actually harmful.

Intratumoral radiation comprises radiation by burying the seeds in tissue so that preferably the seeds are completely surrounded by the tissue. The seeds may be buried in the diseased tissue itself, or adjacent thereto.

Intratumoral radiation may be successfully practiced by providing a removable seed having a permanent withdrawal member, said seed being adapted to be used in a seed implanting instrument.

The present invention relates to the process of making removable seeds having a permanent withdrawal member attached thereto and is an improvement on the process set forth in my Patent No. 1,655,156, granted January 3, 1928, for a method of making emanation seeds.

The seed made by the process of the present application may be of metal or its equivalent, which will function to absorb undesirable rays. However, in the preferred form the removable seed carrying the permanent withdrawal member is composite and comprises a metal tube enclosing a glass tube carrying radium emanation, the withdrawal member being permanently attached to the metal tube. In this preferred form the removable seed filters out the beta rays and allows the gamma rays to pass. The metal tube may be constructed of any suitable material, such as platinum, gold, or alloys of either of these metals. It is desired to point out that my invention in one of its forms contemplates the process of making a tube of a continuous piece of metal closed at both ends and having a permanent withdrawal or removal member attached thereto, said seed being capable of being used in a tube implanting instrument.

Tubes provided with a permanent withdrawal member can be implanted in deep-seated lesions since they are adapted to be used with a seed implanter, whereby the seed may be implanted at any desired depth. In this connection it may be stated that deep-seated lesions and superficial lesions are treated differently. Applicators may be applied to superficial lesions or to natural cavities, that is, hollow organs. However, tubes or seeds are used when it is desired to treat deep-seated lesions which usually necessitate implantation by passing through healthy tissue. The provision of a continuous metal tube having both of its ends closed and having a permanent withdrawal member as a part thereof, enables the treatment of deep-seated lesions without cutting the tissue, and the control of the amount of radium emanation applied to the lesion since the seed can be withdrawn at will, whereby the lesion is not subjected to the permanent presence of the seed. The removable seed may be economically made by the method hereinafter set forth.

In order that my invention may be clearly understood, it will be described in connection with the accompanying drawing in which:

Fig. 1 is a cross-section of the metal tube from which the finished seed is made, together with a work holder therefor.

Fig. 2 is a cross-section of the metal tube with the ends filed down and held in a work holder together with a sizing wire and a burnisher.

Fig. 3 is a cross-section of the metal tube with one of its ends closed around the sizing wire.

Fig. 4 is a cross-section of the metal tube with the sizing wire removed.

Fig. 5 is a cross-section of the metal tube with a thread therein.

Fig. 6 is a cross-section of the metal tube with the thread in its final position just before the tube is charged with radium emanation and its open end closed.

Fig. 7 is a cross-section of a metal tube carrying a permanent withdrawal member and held by a wire holder, the tube being ready to receive a glass emanation seed or container.

Fig. 8 is a similar view, showing the glass emanation tube in position and the open end of the metal tube about to be closed.

Fig. 9 is a cross-section of a finished composite emanation tube provided with a permanent withdrawal or removal member.

Fig. 10 is a side elevation of a glass tube containing radium emanation.

Fig. 11 is a cross-section through a removable composite seed implanted in tissue, the end of the tube carrying the attached thread or withdrawal member being nearer the surface of the tissue than the other end of the seed.

Referring to Fig. 1, the tube 1 is placed in a work holder 2 and rotated about the axis A—A. While rotating, end 3 of the tube 1 is filed, as shown by the dotted lines, to provide a conical surface 4. Into the open end 3 there is placed a sizing wire 5, one end of the latter being held in the chuck 6. As the work holder 2 is rotated, a burnisher 7 is pressed against the end of the tube 1, pressure being applied in direction of the arrow. As a result thereof, the conical surface 4 assumes the shape shown in Fig. 3. The wire 5 is then removed from the tube 1, leaving the latter as shown in Fig. 4. A suitable withdrawal member such as thread 9, for example a well waxed or paraffined silk thread, having a shoulder 10 which preferably is in the form of a knot, is then inserted through the aperture 8. The thread 9 is then pulled in the direction of the arrow until the shoulder 10 abuts against the interior curved end wall of the tube 1. In this manner a permanent withdrawal member 9 is formed.

The seed, as shown in Fig. 6, may be charged with radium emanation through its open end and then closed.

A composite seed carrying a permanent withdrawal or removable member may be prepared as indicated in Figs. 7, 8 and 9. The metal tube 1, shown in Fig. 6, carrying any one of the removable members hereinafter referred to, is placed in the work holder 2, as shown in Fig. 7 and rotated about the axis A—A. While rotating the end 15 the tube 1 is filed, as shown by dotted lines, to provide a conical surface 16, as shown in Fig. 8. Thereafter, the work holder is stopped, and a glass emanation tube 18 containing radium emanation is introduced into the bore of the tube 1, as shown in Fig. 8. The burnisher 17 is then brought against the filed end of the metal tube 1 and the tube is rotated about the axis A—A, the burnisher being applied in the direction of the arrow. As a result thereof, the conical surface 16 assumes the shape shown in Fig. 9, thereby providing a finished and removable seed having a permanent withdrawal member ready for implantation in tissue through a seed implanter.

The withdrawal member 9 may be formed of any suitable material but, as indicated, a thread made of silk and well waxed or paraffined is preferred, satisfactory results having been secured with the same. Instead of using a waxed or paraffined thread, a permanent member, as follows, may be used. (a) A flexible metal wire using as a shoulder, a ball of fused metal at its end. (b) A flexible metal wire using as a shoulder, a hook at its end. (c) A flexible metal wire as part of the seed, soldered to its end. (d) A flexible metal wire as part of the seed, soldered to the metal tube. (e) A flexible metal wire as part of the seed thrust into the metal tube. This may be accomplished by placing a platinum tube in a work holder and then, while the tube is rotating, filing its open end. Thereafter a flexible metal wire with a small hook about 1 mm. in length is introduced into the bore of the tube for a distance of about .5 to 1 mm. A burnisher is then pressed sharply against the filed end of the tube so that the wire becomes embedded in the metal. In this manner the platinum is pressed around the wire and the contact made thereby is sufficiently strong to enable the wire to withstand an appreciable pull thereon. This method of securing the wire to the tube is based on the property of platinum being soft and malleable.

When using a waxed or paraffined withdrawal member, the shoulder or knot 10 should be well paraffined as this aids in forming an air-tight closure when the knot is brought against the curved end wall. As indicated, various equivalents of the paraffined thread may be used, provided they function to make the withdrawal member resistant to decay when left in the tissue.

When a seed of the composite or non-composite type is placed in the tissue 19, the end of the tube 1 to which the thread 9 is attached is nearer the tissue surface 20 than the other end 21 of the tube. As shown in Fig. 11, after the seed or tube 1 has been placed in the tissue 19, the thread 9 appears above the tissue surface 20, coming out of the portal of entrance made in inserting the seed in the tissue. After sufficient time has elapsed to give the desired dosage of radiation, the seed or tube 1 may be removed by pulling the thread 9 in the direction of the arrow, as shown in Fig. 11, and pulling the seed out of the tissue.

The present application is a division of application, Serial No. 80,851,, filed January 12, 1926.

What I claim is:

1. The process of making a removable metal seed having a permanent withdrawal member attached thereto, said seed containing radium emanation, comprising removing metal from one end of the tube, forming a reduced aperture at said end to receive a withdrawal member, inserting the withdrawal member through the large end of the tube and against the walls of the reduced end of the tube, charging the tube with radium emanation through the open end, and then closing the tube to provide a finished seed resistant to the escape of the radium emanation.

2. The process of making a removable seed having a permanent withdrawal member attached thereto, said seed containing radium emanation, comprising removing metal from one end of the tube, forming a reduced aperture at said end, said aperture being of a size sufficient only to receive a withdrawal member, providing an abutment at the end of the withdrawal member, inserting the withdrawal member through the large end of the tube and against the walls of the reduced end, charging the tube with radium emanation through the open end, and then closing the tube to provide a finished seed resistant to the escape of the radium emanation.

3. The process of making a removable seed having a permanent withdrawal member attached thereto, said seed containing radium emanation, comprising forming a reduced aperture at one end of an open tube, inserting a sizing wire therein, closing the tube end around the sizing wire, withdrawing the sizing wire from the tube whereby a reduced aperture is formed of a size sufficient only to receive a withdrawal member, providing an abutment at the end of the withdrawal member, inserting the withdrawal member first through the large end of the tube and then through the small aperture of the tube until the abutment is in tight engagement with the walls of the tube, charging the tube with radium emanation through the open end, and then closing the tube to provide a finished seed.

4. The process of making a composite removable emanation seed consisting of a glass tube enclosed in a metal tube, the latter being provided with a permanent withdrawal member, comprising removing metal from one end of the metal tube, forming a reduced aperture at said end, inserting a withdrawal member through the open end of the tube and then through the reduced end until said withdrawal member is in tight engagement with said reduced end, inserting a glass tube containing radium emanation into the partially closed metal tube, and thereafter reducing the open end of the tube to provide a removable seed capable of absorbing the undesirable rays radiating from the radium emanation.

5. The process of making a composite removable emanation seed consisting of a glass tube enclosed in a metal tube having less metal at its ends than at its intermediate portion, comprising removing a portion of the metal on one of the ends of the metal tube, partially upsetting and closing said end to provide an aperture adapted to receive a withdrawal member in tight engagement with said partially upset enclosed end, inserting the withdrawal member through the open end of the tube and then through the reduced end to make a tight engagement therewith, inserting the glass tube into the partially closed metal tube, and thereafter removing the metal from the open end of the metal tube and upsetting said latter open end to provide a closed removable metal tube having less metal at its ends than at its intermediate portion and capable of absorbing the undesirable rays radiating from the radium emanation.

6. The process of making a removable metal seed having a permanent withdrawal member attached thereto, said seed containing radium emanation, comprising removing metal from one end of the tube, forming a reduced aperture at said end to receive a withdrawal member resistant to decay, inserting the withdrawal member through the large end of the tube and against the walls of the reduced end of the tube, charging the tube with radium emanation through the open end, and then closing the tube to provide a finished seed resistant to the escape of the radium emanation.

7. The process of making a removable metal seed having a permanent withdrawal member attached thereto, said seed containing radium emanation, comprising removing metal from one end of the tube, forming a reduced aperture at said end to receive a silk withdrawal member, inserting the withdrawal member through the large end of the tube and against the walls of the reduced end of the tube, charging the tube with radium emanation through the open end, and then closing the tube to provide a finished seed resistant to the escape of the radium emanation.

8. The process of making a composite removable emanation seed consisting of a glass tube enclosed in a metal tube, the latter being provided with a permanent withdrawal member, comprising removing metal from one end of the metal tube, forming a reduced aperture at said end, inserting a withdrawal member resistant to decay through the open end of the tube and then through the reduced end until said withdrawal member is in tight engagement with said reduced end, inserting a glass tube containing radium emanation into the partially closed metal tube, and thereafter reducing the open end of the tube to provide a removable seed capable of absorbing the undesirable rays radiating from the radium emanation.

9. The process of making a composite removable emanation seed consisting of a glass tube enclosed in a metal tube, the latter being provided with a permanent withdrawal member, comprising removing metal from one end of the metal tube, forming a reduced aperture at said end, inserting a silk withdrawal member through the open end of the tube and then through the reduced end until said withdrawal member is in tight engagement with said reduced end, inserting a glass tube containing radium emanation into the partially closed metal tube, and thereafter reducing the open end of the tube to provide a removable seed capable of absorbing the undesirable rays radiating from the radium emanation.

10. The process of making a removable seed having a permanent withdrawal member attached thereto, said seed containing radium emanation, comprising forming a reduced aperture at one end of an open tube, inserting a sizing element therein, closing the tube end around the sizing element, withdrawing the sizing element from the tube whereby a reduced aperture is formed of a sufficient size only to receive a withdrawal member, providing an abutment at the end of the withdrawal member, inserting the withdrawal member first through the large end of the tube and then through the small aperture of the tube until the abutment is in tight engagement with the walls of the tube, charging the tube with radium emanation through the open end, and then closing the tube to provide a finished seed.

11. The process of making a composite removable seed consisting of a metallic outer tube adapted to filter objectionable rays, an inner tube containing radium emanation and a permanent withdrawal member comprising forming a reduced aperture at one end of the metallic tube, inserting a withdrawal member in said tube and adjacent said reduced aperture, inserting the inner tube in said outer tube, and thereafter removing the metal from the open end of the outer metal tube and upsetting said latter open end to provide a closed removable composite seed.

12. The process of making a composite removable seed consisting of a metallic outer tube adapted to filter objectionable rays, an inner tube containing radium emanation, and a permanent withdrawal member, comprising forming a reduced aperture at one end of the metallic tube, inserting a withdrawal member in said tube and adjacent said reduced aperture, inserting the inner tube in said outer tube, and closing the latter to provide a finished seed.

13. The process of making a composite removable seed consisting of a platinum outer tube adapted to filter objectionable rays, a glass inner tube containing radium emanation, and a permanent withdrawal member, comprising forming a reduced aperture at one end of the metal tube, inserting a withdrawal member at one end of the tube and adjacent said reduced aperture, inserting the inner tube in said outer tube, and closing the latter to provide a finished seed.

In testimony whereof I hereunto affix my signature.

JOSEPH MUIR.